United States Patent [19]
Chen et al.

[11] Patent Number: 5,270,837
[45] Date of Patent: Dec. 14, 1993

[54] METHOD AND APPARATUS FOR ENABLING INTELLIGENT POST-PROCESSING OF DIFFERING DATA TYPES

[75] Inventors: Kok Chen, Palo Alto; Randall G. Guay, Cupertino, both of Calif.

[73] Assignee: Apple Computer, Inc., Cupertino, Calif.

[21] Appl. No.: 768,134

[22] Filed: Sep. 27, 1991

[51] Int. Cl.⁵ .............................................. H04N 1/40
[52] U.S. Cl. .................................. 358/467; 358/429; 358/462
[58] Field of Search ............ 358/400, 403, 426, 261.1, 358/261.2, 261.3, 261.4, 427, 429, 432, 433, 438, 443, 455, 456, 460, 462, 467, 470, 133

[56] References Cited

U.S. PATENT DOCUMENTS

| | | | |
|---|---|---|---|
| 4,266,249 | 5/1981 | Chai et al. | 358/429 |
| 4,910,608 | 3/1990 | Whiteman et al. | 358/433 |
| 5,079,630 | 1/1992 | Golin et al. | 358/133 |

*Primary Examiner*—Edward L. Coles, Sr.
*Assistant Examiner*—Jerome Grant, II
*Attorney, Agent, or Firm*—Stuart J. Madsen

[57] ABSTRACT

An apparatus and method for enabling intelligent post-processing of differing data types wherein different types of data are encoded with different sets of values such that a post-processing apparatus is able to recognize and delineate between the different types and perform post-processing procedures on only the appropriate type.

13 Claims, 4 Drawing Sheets

METHOD AND APPARATUS FOR ENABLING INTELLIGENT POST-PROCESSING OF DIFFERING DATA TYPES

BACKGROUND OF THE INVENTION

1. Field of the Invention

The present invention relates generally to data handling and information encoding methods, and more specifically to a method for enabling intelligent post-processing of differing data types in an imaging system.

2. History of the Art

With the technological advances made in the field of computer imaging devices, i.e., monitors and printers, increased emphasis has been applied to achieving clearer and higher resolution output with increased cost effectiveness. The drive for a "better picture" has resulted in an influx of high quality printing and display techniques, and the practical extinction of the lower quality prior art devices.

Traditional imaging systems normally produce a final output image using two distinct steps. In a first step, imaging data is commonly encoded and placed into a frame store. In a second step, when the frame store is at least partially filled, this encoded data is extracted and transmitted to a marking device, i.e., a printer. Traditionally, the frame store has contained the precise marking pattern to be utilized by the marking device when producing the final output image.

For example, in an ordinary prior art bi-level imaging system, with a marking device capable of either creating a mark at a given spot or leaving the spot blank, the frame store consists of binary memory with each bit in the memory representing a spot on the device's output medium. For imaging systems which include marking devices capable of imaging in multiple colors or gray levels, each spot to be imaged by the device is represented by a corresponding value in the frame store that specifies the color or luminance of that particular spot. Unfortunately, traditional methods of imaging allow only straight-forward post-processing (processing performed after transmission of the imaging data from the CPU to the marking device) of the frame-stored data. This, in turn, limits the quality of the output that can be extracted from the devices.

SUMMARY OF THE INVENTION

The apparatus and method in accordance with the preferred embodiment of the present invention eliminates the post-processing limitations imposed by prior art devices by enabling any post-processing apparatus to recognize and delineate between differing data types. This provides the post-processing apparatus with the ability to perform different operations on differing data types, resulting in a substantially improved final output image.

In the preferred embodiment, differing data types are encoded differently before being placed into the frame store. For example, text and graphics information is encoded using a first set of values whereas continuous-toned image information is encoded using a second set of values, different from the first. With the identity of the differing data types intact in the frame store, the post-processing apparatus can identify an individual data type and perform an operation on only that type. For example, if the post-processing phase includes an anti-aliasing device, the device would be capable of differentiating between text data and image data. It could then operate on the text data while allowing the image data to pass through without modification. This effectively enables the anti-aliasing device to enhance the appearance of the text data while avoiding the degradation of image data in the process.

IN THE DRAWING

DETAILED DESCRIPTION OF THE PREFERRED EMBODIMENT

Generally, the prior art imaging systems and methods normally employed in today's imaging field comprise a number of data sources or generators coupled to a frame store. The output from the frame store is coupled through a data transformation device to a marking device which produces a final visual output image. For the purposes of explanation of the preferred embodiment, the term "data generator" has been used to denote devices which provide imaging information in digital form. For example, devices which provide scanned images, font rasterizations, line art, and the letter "E" would all be considered data generators. The term "frame store" has been used to denote in general the group of devices normally referred to as frame buffers, bit maps, pixel maps, band buffers, FIFOs, etc. The term "data transformation device" has been used to denote devices, circuits, etc. which act to transform the store data into an exact bit pattern used by the marking device to produce a final output image.

Figure 1:
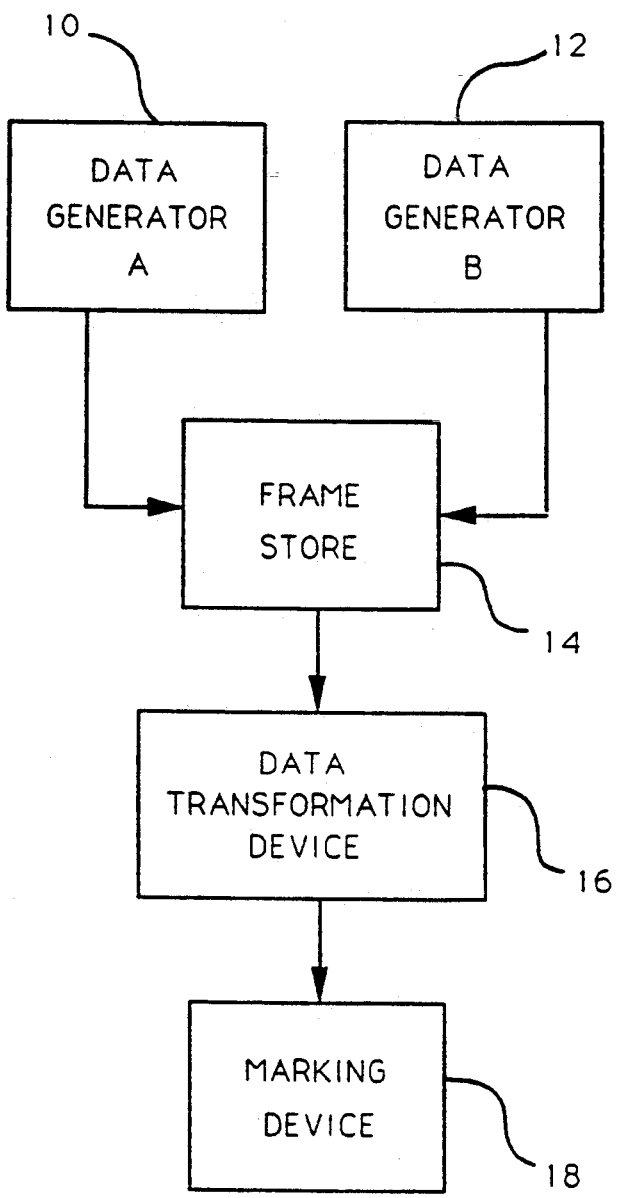
FIG. 1 is a block diagram illustrating a prior art imaging system and method.

Referring to the specific prior art embodiment illustrated in FIG. 1, two separate data generators, Data Generator A 10 and Data Generator B 12, are coupled to a single Frame Store 14. For the purposes of illustration, we will assume that the data from Data Generator A 10 is text data (i.e., the letter "E"), and the data from Data Generator B 12 is grayscale image data (i.e., a photograph that has been digitized by a scanner). The output from Frame Store 14 is coupled to the input of a Data Transformation Device 16, the output of which is coupled to a Marking Device 18. For the purposes of the present explanation, we will assume that Marking Device 18 is a printer.

Traditionally, in non-grayscale systems, the method employed for storing data from the data generators in the frame store involves storing a bit of information in the frame store to represent a corresponding output position on a piece of printer paper (or, more generally, a corresponding output position on any imaging apparatus, i.e., a computer monitor, etc.). Newer devices utilize more bits at each location in the frame store to enable representation of various grayscale levels or colors at a single corresponding output position. In either case, there is normally a one to one (pixel to pixel) correspondence between the final output image and the frame stored data. In the prior art system depicted in FIG. 1, data from Data Generators 10 and 12 is initially stored in Frame Store 14 in exact correspondence to the bit pattern used to produce a final visual output image, as described above. The data stored in Frame Store 14 is then transmitted to Data Transformation Device 16, which is normally operative to perform some type of post-processing operation on the data, i.e., anti-aliasing. The transformed data from Data Transformation Device 16 is then input into Marking Device 18 (in this example, a printer) which actually produces the final visual output image.

A significant inadequacy in this type of system results from the common encoding of data from the data generators. This encoding method allows only common post-processing operations to be performed on the data output from the frame store. That is, once the data from Data Generators 10 and 12 is input into Frame Store 14, the data's source identity is lost. Thus, expanding on the example above, text data (from Data Generator A 10) and grayscale image data (from Data Generator B 12) are encoded in the same manner and appear the same once stored in the frame store. The result is that all of the stored data output from Frame Store 14 now looks the same to Data Transformation Device 16, which cannot delineate between the original text data and image data. Unfortunately, a consequence of this encoding scheme is that any post-processing performed on the output data from Frame Store 14 must now be performed on both the text data and the grayscale image data. This situation ultimately results in a substantial degradation of the final output image.

The major reason for this image degradation is that most post-processing procedures are data type sensitive. In other words, certain post-processing may be appropriate for one type of data, i.e., text, but inappropriate for another data type, i.e., grayscale images. A specific example of one type of this "data-type-sensitive" post-processing is anti-aliasing. Anti-aliasing is a technique well known in the art and is, simply stated, a refinement in the horizontal direction of the edges of text or graphics. It is normally used to smooth the edges of text in order to enhance the appearance of the final output image. However, anti-aliasing is normally inappropriate for grayscale images. Grayscale images are formed by combining pixels into pixel groups in accordance with a desired grayscale level. If an anti-aliasing pass is made on the grayscale image data corresponding to a given pixel group, and an "edge" in this group is "smoothed," the ratio of gray in the pixel group will change, and the final grayscale portion of the output image will be negatively affected.

The present invention obviates the post-processing problems inherent in the prior art devices by enabling the data transformation device to recognize and delineate between differing data types. Generally, this is achieved by storing intelligent numbers in the frame store corresponding to the specific data source from which the numbers were generated. For example, text data would be encoded using a first set of values and grayscale image data would be encoded using a second set of values, different from the first. This would enable the data transformation devices appropriate for text to recognize and operate only on text data, and, likewise, enable the data transformation devices appropriate only for grayscale images to recognize and operate only on grayscale image data. The result is a final output image with very high contrast, sharp text, and images which appear continuous, smooth and correctly leveled.

Figure 2:
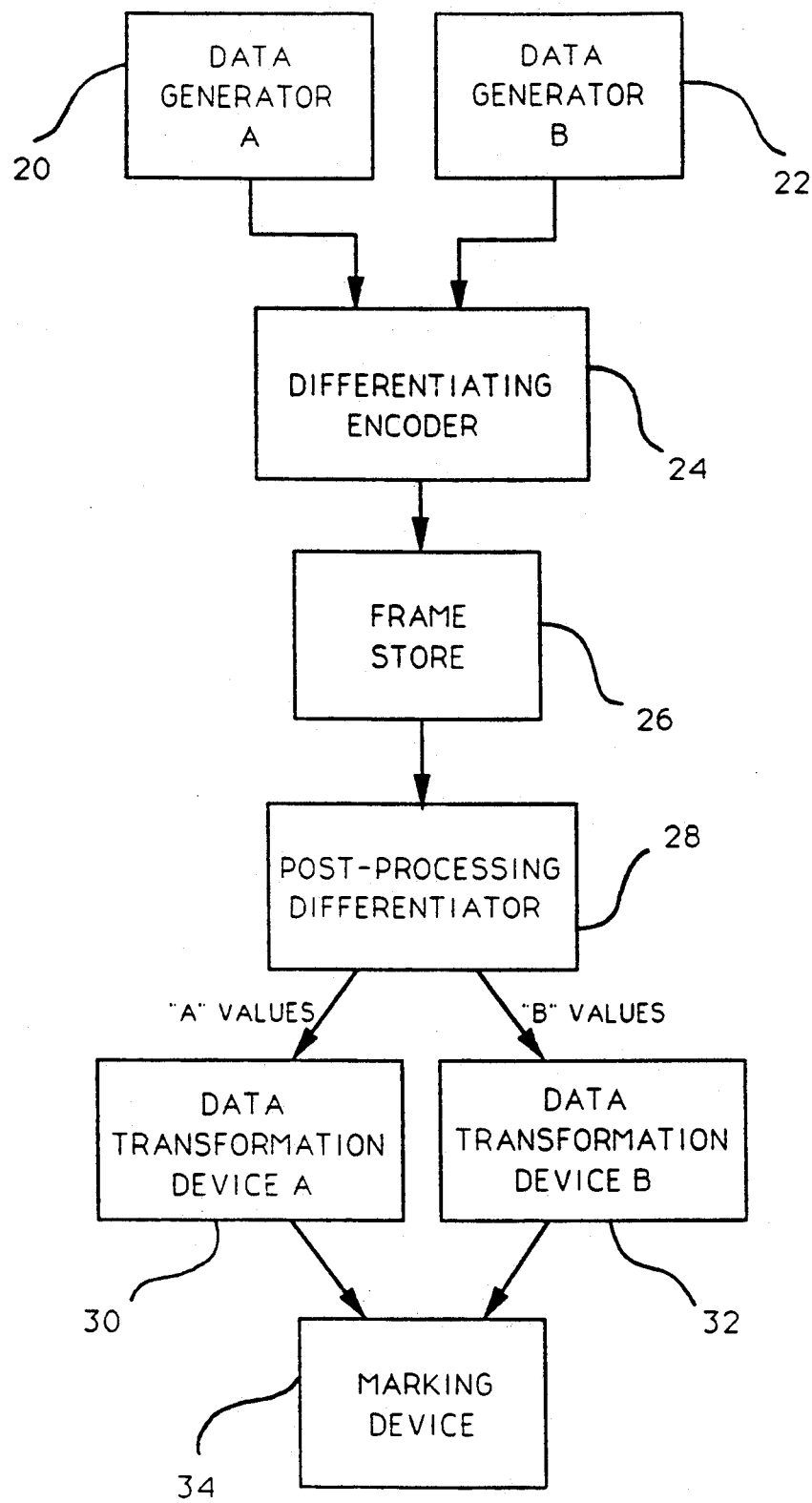
FIG. 2 is a block diagram illustrating an imaging system and method in accordance with the preferred embodiment of the present invention.

Referring now to FIG. 2, shown is a block diagram illustrating the preferred apparatus and method for enabling intelligent post-processing of differing data types in accordance with the present invention. A first data generator, Data Generator A 20, and a second data generator, Data Generator B 22, are coupled to a Differentiating Encoder 24. The output from Differentiating Encoder 24 is coupled to the input of a Frame Store 26, the output of which is coupled to the input of a Post-Processing Differentiator 28. The output from Post-Processing Differentiator 28 is split according to the source of the data stored in Frame Store 26. Data originally from Data Generator A 20 is coupled to the input of a Data Transformation Device A 30, and data originally from Data Generator B 22 is coupled to the input of a Data Transformation Device B 32. The outputs from Data Transformation Device A 30 and Data Transformation Device B 32 are coupled to the input of a Marking Device 34.

To illustrate the advantages of the preferred embodiment, we will once again assume that the data output from Data Generator A 20 is text data and that the data output from Data Generator B 22 is grayscale image data. Likewise, we will once again assume that Marking Device 34 is a printer. When the data from the data generators is input into Differentiating Encoder 24, text data from Generator A 20 is encoded with a first set of "A" values, say, 1–10, and grayscale image data from Generator B 22 is encoded with a second set of "B" values, say, 11–20. The encoded data output from Differentiating Encoder 24 is then sequentially stored in Frame Store 26. Both the encoding of the data from the data generators and the storage of the data in the frame store are achieved using methods well known in the art.

When the frame store contains an appropriate amount of data to begin transmission to the marking device (normally after the frame store has been filled), the data is sequentially input into Post-Processing Differentiator 28. Differentiator 28 is operative to recognize the encoded data and to delineate between the original text data and grayscale image data. That is, Differentiator 28 recognizes the values 1–10 as being "A" value text data from Data Generator A 20, and the values 11–20 as being "B" value grayscale image data from Data Generator B 22. This enables the post-processing differentiator to transmit the text data to Data Transformation Device A 30, and grayscale image data to Data Transformation Device B 32.

The main advantage of this post-processing split of the frame stored data is that different post-processing functions can now be applied to the data according to data type. For example, Data Transformation Device A 30 could be an anti-aliasing chip appropriate only for text data, as described in detail above. Because Device A 30 receives only "A" value text data, anti-aliasing is performed only on the text data before transmission to Marking Device 34. The "B" value grayscale image data is passed through Data Transformation Device B 32, which could perform a function appropriate only for grayscale image data, and passes to Marking Device 34 untouched by the anti-aliasing process. This gives the desired results of high contrast, sharp text output and visually superior continuous grayscale output from the marking device.

Of course the embodiment illustrated in FIG. 2 is only one of a number of possible system configurations. Any number of data generators could be coupled to the differentiating encoder, or there could be a single data generator operating in different modes. For instance, image overlays comprised of transparent, translucent or opaque images may be created by a single data generator operating in different modes. However, as far as encoding for post-processing purposes is concerned, each mode would be perceived as a separate data generator and would be encoded with differing data type values. Additionally, the function of the post-processing differentiator could be handled by the data transformation device. For example, Data Transformation Device A 30 and Data Transformation Device B 32 could be integrated into a single unit. This unit would listen to a single data stream from Frame Store 26 and would include the functionality to split the data stream from the frame store according to data type (in a manner similar to that described above). The unit could then perform the appropriate post-processing operations on the corresponding appropriate data types.

Another important alternative to the embodiment as depicted in FIG. 2 is an imaging system that does not rely on a frame store to store data for transmission to the marking device. That is, it is specifically contemplated that one embodiment of the present invention includes a single data generator, or plurality of data generators, which encode data according to data type, but which transmit this encoded data directly to the data transformation device. Using FIG. 2 for illustration, Data Generator A 20 and Data Generator B 22 would still be coupled to Differentiating Encoder 24 as described above. However, in this embodiment, the output from Encoder 24 would be directly coupled to the input of Post-Processing Differentiator 28. The rest of the imaging system would function and interrelate in exactly the same manner as described in detail above.

It is equally important to note that the preferred apparatus and method described above are also appropriate for the color system environment. For example, we may want to perform anti-aliasing on all blue text, but would want blue images to remain smooth and continuous. In this instance, blue text data would be encoded using a first set of values, and blue image data would be encoded using a second set of values, different from the first. The resulting final output image would have the same benefits as those described in the grayscale context described in detail above.

Figure 3:
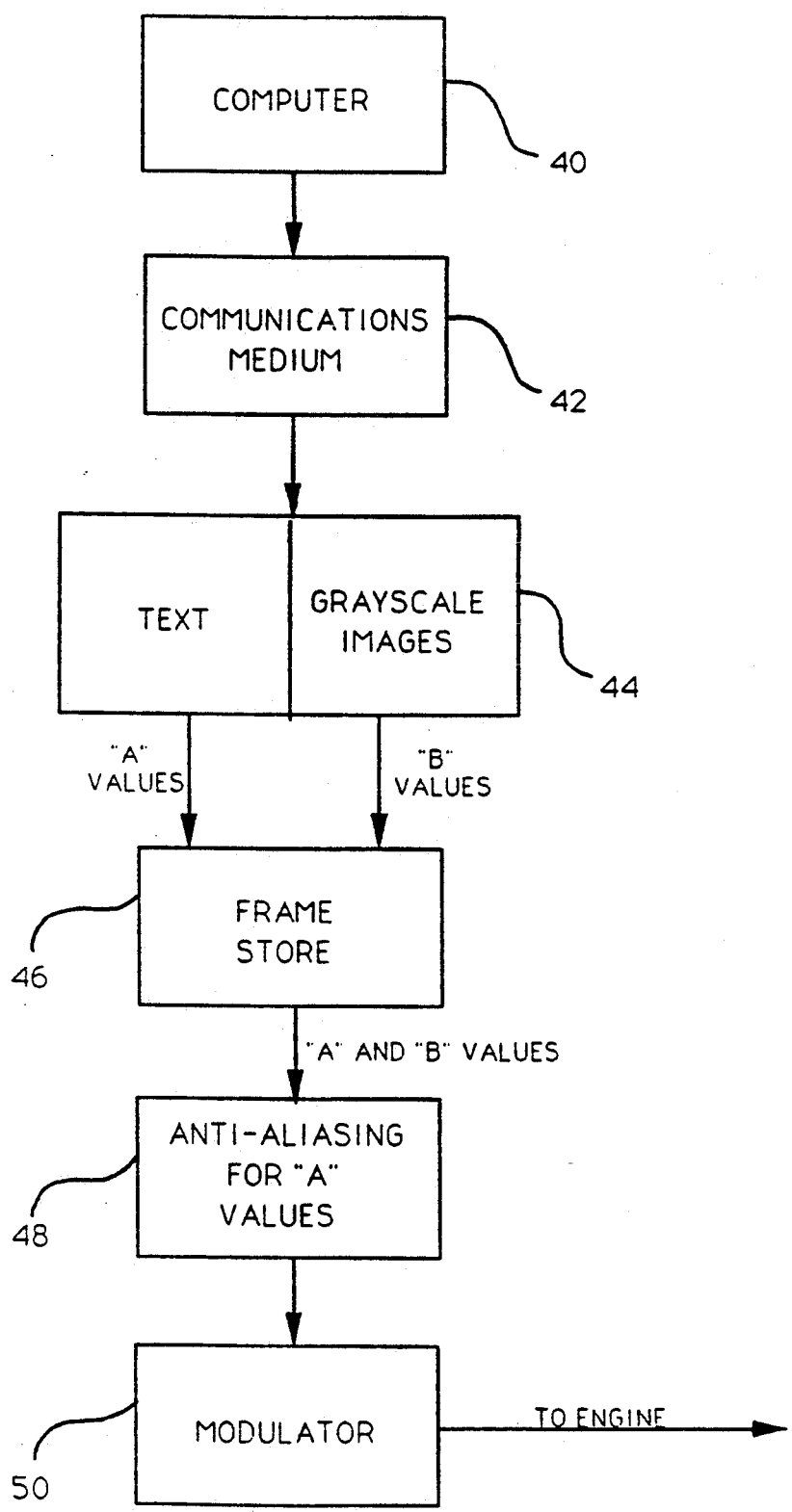
FIG. 3 is a block diagram illustrating an alternative embodiment of the imaging system and method in accordance with the present invention.

To further illustrate the present invention, we will now refer to the alternative embodiment depicted in the block diagram of FIG. 3. Shown is a computer 40 coupled via a Communications Medium 42 to an Interface Controller 44. Interface Controller 44 could be a hardware or software device, but is normally a language program for encoding data in a format appropriate for use by an imaging device, i.e., printer. For the purposes of illustration in FIG. 3, Controller 44 is divided into two separate modules, one for text, and one for grayscale images. This division was made to emphasize the fact that the controller encodes the input data according to data type before outputting the encoded data to the framestore, Framestore 46 in FIG. 3. A common output data stream from Frame Store 46 is passed through an Anti-Aliasing Device 48 to a Modulator 50, and then on to the print engine.

In this example, the language program (Controller 44) interprets the input data stream from the communications medium and encodes the data according to data type. Text data would, for example, be encoded with "A" values, whereas, grayscale image data would be encoded with "B" values. Thus, when the output from the program is input into Frame Store 46, the frame store is sequentially filled with intelligent numbers representative of original data type. As the framestore outputs this encoded data to Anti-Aliasing Device 48, the device is able to differentiate between the "A" value data and the "B" value data, and to operate on only the "A" data. Thus the "A" value text data can be smoothed by the anti-aliasing process while the "B" value grayscale image data passes through untouched by the anti-aliasing process. The modulator sees the modified "A" data and the original "B" data at it's input and modulates the print engine in accordance with this information. The result, as described above, is a much better final output image.

Figure 4:
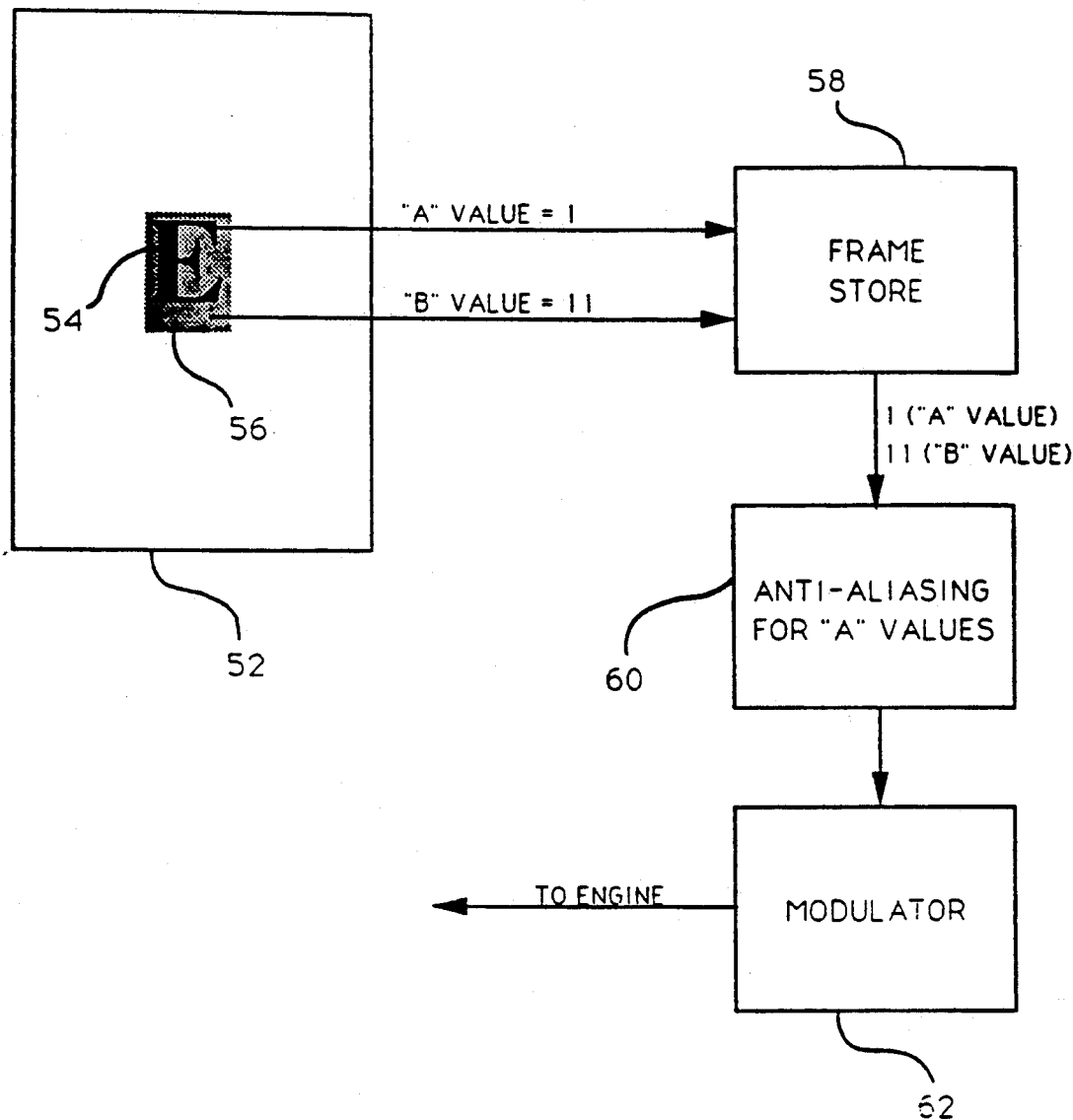
FIG. 4 is a block diagram illustrating a specific example of the operation of the imaging system and method in accordance with the present invention.

Referring now to FIG. 4, depicted is a specific example of the operation of the apparatus and method in accordance with the preferred embodiment of the present invention. Data Block 52 represents a portion of information from the language program (described above) to be imaged. It contains text information, a letter "E" 54, and grayscale information, a Gray Border Area 56 around the "E." As shown, "E" 54 has been encoded with an "A" value of 1, and Gray Border Area 56 has been encoded with a "B" value of 11. These values are input into a Frame Store 58, the output of which is coupled to the input of an Anti-Aliasing Device 60. The output from Device 60 is coupled to the input of a Modulator 62 which drives the print engine as described above.

As is shown in the figure, the data streams to and from Frame Store 58 have retained the original data values output from Data Block 52, where the values were assigned according to data type. Thus, Anti-Aliasing Device 60 is able to differentiate between the input value "1" (an "A" value) and the input value "11" (a "B" value), and to operate on only the "1." The "11" value will pass through Device 60 unaffected. This means that anti-aliasing will only affect text data "E" 54, and will not affect the grayscale level of Gray Border Area 56, resulting in the desired high quality final output image.

Whereas the preferred embodiment of the present invention has been described above, it is contemplated that other alternatives and modifications may become apparent to those skilled in the art after having read the above disclosure. It is therefore intended that the appended claims be interpreted as covering all such alterations and modifications as fall within the true spirit and scope of the invention.

What is claimed is:

1. A method for enabling intelligent post-processing of differing data types in an imaging system, comprising the steps of:
   generating a plurality of sets of image data, each such set being of a respective data type different from the data types of the other sets of image data;
   encoding each of the plurality of differing types of data upon generation of the respective sets of image data with a unique set of values representative of an individual data type;
   storing said values in a frame storing means;
   reading said values from said frame storing means and differentiating between said unique sets of values; and,
   post-processing said differing data types according to said unique sets of values read from said frame storing means;

such that, a specific post-processing procedure appropriate for only one said individual data type is applied only to said one individual data type, and said differing data types which are not appropriate for said specific post-processing procedure remain unaffected by said procedure.

2. The method of claim 1 wherein said plurality of differing data types include text data and grayscale image data, and further wherein said text data is encoded using a first set of values and said grayscale image data is encoded using a second set of values, different from said first set.

3. The method of claim 1 wherein said post-processing step includes anti-aliasing.

4. The method of claim 2 wherein said post-processing step includes anti-aliasing for application only to said text data.

5. An apparatus for enabling intelligent post-processing of differing data types in an imaging system, comprising:
    means for generating imaging data of a plurality of differing data types and concurrently encoding the imaging data according to a respective specific data type;
    storing means, coupled to said encoding means, for storing said encoded data; and,
    post-processing means, coupled to said storing means, for reading said encoded data from said storing means and differentiating between said specific data types in accordance with said encoding, and further for modifying said encoded data according to said specific data type;
    whereby said post-processing means is capable of modifying at least a first said specific data type without affecting any other said specific data types.

6. The apparatus of claim 5 wherein said imaging data includes a first data type, text data, and a second data type, grayscale image data.

7. The apparatus of claim 6 wherein said post-processing means includes anti-aliasing means for modifying said text data without affecting said grayscale image data.

8. A method for enabling intelligent post-processing of differing data types in an imaging system, comprising the steps of:
    generating a plurality of sets of image data, each such set being of a respective data type different from the data types of the other sets of image data;
    encoding each of the plurality of differing types of data upon generation of the respective sets of image data with a unique set of values representative of an individual data type;
    transmitting said values to a post-processing means; and,
    post-processing said differing data types according to said unique sets of values transmitted from said encoding means;
    such that, a specific post-processing procedure appropriate for only one said individual data type is applied only to said one individual data type, and said differing data types which are not appropriate for said specific post-processing procedure remain unaffected by said procedure.

9. The method of claim 8 wherein said plurality of differing data types include text data and grayscale image data, and further wherein said text data is encoded using a first set of values, and said grayscale image data is encoded using a second set of values, different from said first set.

10. The method of claim 9 wherein said post-processing step includes anti-aliasing for application only to said text data.

11. An apparatus for enabling intelligent post-processing of differing data types in an imaging system, comprising:
    means for generating imaging data of a plurality of differing data types and concurrently coding the imaging data according to a respective specific data type;
    differentiating means, coupled to said encoding means, for differentiating between differing types of data according to the encoding by said encoding means; and,
    post-processing means, coupled to said differentiating means, for processing said differentiated data according to data type;
    whereby said post-processing means is capable of modifying at least a first said specific data type without affecting any other said specific data types.

12. The apparatus of claim 11 wherein said first specific data type is text data, and further wherein said imaging data includes a second specific data type, grayscale image data.

13. The apparatus of claim 11 wherein said post-processing means includes anti-aliasing means for modifying said text data without affecting said grayscale image data.

* * * * *